United States Patent
Kachman et al.

(10) Patent No.: US 11,586,864 B2
(45) Date of Patent: Feb. 21, 2023

(54) PRIOR KNOWLEDGE-BASED TOPOLOGICAL FEATURE CLASSIFICATION

(71) Applicant: International Business Machines Corporation, Armonk, NY (US)

(72) Inventors: Tal Kachman, Haifa (IL); Lior Horesh, North Salem, NY (US); Kenneth Lee Clarkson, Madison, NJ (US); Mark S. Squillante, Greenwich, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1043 days.

(21) Appl. No.: 16/276,719

(22) Filed: Feb. 15, 2019

(65) Prior Publication Data
US 2020/0265274 A1    Aug. 20, 2020

(51) Int. Cl.
*G06K 9/00* (2022.01)
*G06K 9/62* (2022.01)
(Continued)

(52) U.S. Cl.
CPC .......... *G06K 9/6278* (2013.01); *G06F 17/16* (2013.01); *G06N 5/04* (2013.01); *G06N 7/005* (2013.01); *G06N 10/00* (2019.01)

(58) Field of Classification Search
CPC ........ G06K 9/6278; G06F 17/16; G06N 5/04; G06N 7/005; G06N 10/00; G06N 20/00
See application file for complete search history.

(56) References Cited

U.S. PATENT DOCUMENTS 11,170,302 B2 * 11/2021 Wiebe ................. G06F 17/16
2017/0364796 A1   12/2017 Wiebe et al.
(Continued)

FOREIGN PATENT DOCUMENTS

WO      2017116446 A1    7/2017
WO   WO-2020164772 A1 *  8/2020  ............. G06F 17/16

OTHER PUBLICATIONS

Lloyd, Seth, et al. "Quantum algorithms for topological and geometric analysis of data." Nature communications 7 (2016): 10138. arXiv:1408.3106v2 [quant-ph] Dec. 15, 2015. 20 pages.
(Continued)

*Primary Examiner* — Naum Levin
(74) *Attorney, Agent, or Firm* — Amin, Turocy & Watson, LLP

(57) ABSTRACT

Techniques regarding topological classification of complex datasets are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a quantum computing component that can encode eigenvalues of a Laplacian matrix into a phase on a quantum state of a quantum circuit. The computer executable components can also comprise a classical computing component that infers a Betti number using a Bayesian learning algorithm by measuring an ancilla state of the quantum circuit.

25 Claims, 13 Drawing Sheets

(51) Int. Cl.
G06N 10/00 (2022.01)
G06F 17/16 (2006.01)
G06N 5/04 (2023.01)
G06N 7/00 (2023.01)

(56) References Cited

U.S. PATENT DOCUMENTS

2018/0232649 A1  8/2018  Wiebe et al.
2018/0308000 A1  10/2018  Dukatz et al.

OTHER PUBLICATIONS

Biamonte, Jacob, et al. "Quantum Machine Learning." Mature 549, No. 7671 (2017): 195. arXiv:1611.09347v2 [quant-ph] May 10, 2018. 24 pages.

Hofer, Christoph, et al. "Deep Learning with Topological Signatures." In Advances in Neural Information Processing Systems, pp. 1634-1644. 2017. arXiv:1707.04041v3 [cs.CV] Feb. 16, 2018. 14 pages.

Huang, He-Liang, et al. "Demonstration of Topological Data Analysis on a Quantum Processor" Optica 5, No. 2 (2018): 193-198. arXiv:1801.06316v1 [quant-ph] Jan. 19, 2018. 12 pages.

Schuld, Maria, et al. "Circuit-centric quantum classifiers." arXiv:1804.00633v1 [quant-ph] Apr. 2, 2018. 17 pages.

Siopsis, George, et al. "Quantum topological data analysis with continuous variables " arXiv:1804.01558v1 [quant-oh] Apr. 4, 2018. 7 pages.

Blume-Kohout, Robin, et al. "Optimal, reliable estimation of quantum states." New Journal of Physics 12 (2010) 043034. 26 pages.

Coles, Patrick J. ,et al. "Quantum Algorithm Implementations for Beginners." arXiv:1804.03719v1 [cS.ET] Apr. 10, 2018. 76 pages.

Dey, Tamal, et al. "Improved Image Classification using Topological Persistence." Eurographics Proceedings (2017). 8 pages.

Wang, D., et al. "A Generalised Variational Quantum Eigensolver." https://arxiv.org/abs/1802.00171. 10 pages.

Schuld, M. "Quantum ensembles of quantum classifiers." Scientific Reports, vol. 8 (1), 2772. Feb. 9, 2018, doi:10.1038/s41598-018-20403-3. 12 pages.

Mell, Peter, et al. "The NIST Definition of Cloud Computing." National Institute of Standards and Technology. Sep. 2011. 7 pages.

International Search Report and Written Opinion received for PCT Application Serial No. PCT/EP2019/083994 dated Mar. 12, 2020, 16 pages.

Paesani et al., "Experimental Bayesian Quantum Phase Estimation on a Silicon Photonic Chip", Physical Review Letters, Mar. 15, 2017, 6 pages.

* cited by examiner

PRIOR KNOWLEDGE-BASED TOPOLOGICAL FEATURE CLASSIFICATION

STATEMENT REGARDING FEDERALLY SPONSORED RESEARCH OR DEVELOPMENT

This invention was made with Government support under Contract No.: HR0011-16-C-0040 awarded by Defense Advanced Research Projects Agency (DARPA). The Government has certain rights in this invention.

BACKGROUND

The subject disclosure relates to topological feature classification, and more specifically, to one or more prior knowledge-based inferences of one or more Betti numbers using a hybridization of quantum and classical computing technologies.

Topological data analysis techniques utilize algebraic topology formulations to provide a framework that can be insensitive to the particular metric chosen, provide dimensionality reduction, and/or be robust to noise found in the subject data. Further, topological data analysis can be facilitated by machine learning, deep learning, classification, inference, and/or artificial intelligence tasks. For instance, one or more machine learning tasks can utilize principals of algebraic topology to generate higher and higher levels of abstraction of the subject data, wherein determinations regarding characteristics of the data can then be performed based on the abstractions rather than the raw data.

Traditionally, classical computing techniques or quantum computing techniques have been implemented to perform topological data analyses. Classical computing techniques can readily execute topological data analyses on large datasets. Given the low cost and availability of processing power for classical computing devices, classical computing techniques can exhibit a desired efficiency in analyzing large datasets. However, analysis by classical computing techniques can be limited by the complexity of the data. In contrast, quantum computing techniques can readily execute topological data analyses on complex datasets, but are limited in the amount of data that can be processed. For example, conventional quantum algorithms can require a level of circuit depth or fault tolerance that cannot be readily achieved in near term quantum computing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate topological classification of complex datasets are described.

According to an embodiment, a system is provided. The system can comprise a memory that can store computer executable components. The system can also comprise a processor, operably coupled to the memory, and that can execute the computer executable components stored in the memory. The computer executable components can comprise a quantum computing component that can encode eigenvalues of a Laplacian matrix into a phase on a quantum state of a quantum circuit. The computer executable components can also comprise a classical computing component that infers a Betti number using a Bayesian learning algorithm by measuring an ancilla state of the quantum circuit. An advantage of such a system can be the exploitation of quantum computing for complex computations and classical computing for large computations.

In some examples, the Betti number can be comprised within a plurality of Betti numbers inferred by the classical computing component, and the plurality of Betti numbers can characterize a topology of an object. An advantage of such a system can be the topological classification of complex datasets.

According to an embodiment, a computer-implemented method is provided. The computer-implemented method can comprise encoding, by a system operatively coupled to a processor, eigenvalues of a Laplacian matrix into a phase on a quantum state of a quantum circuit. The computer-implemented method can also comprise inferring, by the system, a Betti number using a Bayesian learning algorithm by measuring an ancilla state of the quantum circuit. An advantage of such a computer-implemented method can be the autonomous implementation of deep learning tasks that can incorporate prior knowledge.

In some examples, the computer-implemented method can comprise repeatedly measuring, by the system, the ancilla state. The ancilla state can be a product state with the quantum state. The computer-implemented method can also comprise generating, by the system, a probability distribution based on the repeatedly measuring. Further, the computer-implemented method can comprise analyzing, by the system, the probability distribution using a Monte Carlo sampling algorithm to update a prior knowledge distribution. An advantage of such a computer-implemented method can be that analyses of the system can be refined based on previous computations to increase accuracy and/or efficiency.

According to an embodiment, a computer program product for topological classification is provided. The computer program product can comprise a computer readable storage medium having program instructions embodied therewith, the program instructions can be executable by a processor to cause the processor to encode, by a system operatively coupled to the processor, eigenvalues of a Laplacian matrix into a phase on a quantum state of a quantum circuit. The program instructions can also cause the processor to infer, by the system, a Betti number using a Bayesian learning algorithm by measuring an ancilla state of the quantum circuit. An advantage of such a computer program product can be the use of quantum computing to facilitate topological classifications without incurring an undesirable fault tolerance.

In some examples, the program instructions can further cause the processor to generate, by the system, a sub-sample object by selectively sampling an object. Also, the program instructions can further cause the processor to characterize, by the system, the sub-sample object using a persistent homology algorithm to generate a quantum superposition state. Moreover, the program instructions can cause the processor to generate, by the system, the Laplacian matrix as a quantum object based on the quantum superposition state. An advantage of such a program product can be the topological classification of complex datasets.

According to an embodiment, a system is provided. The system can comprise a memory that can store computer executable components. The system can also comprise a processor, operably coupled to the memory, and that can execute the computer executable components stored in the memory. The computer executable components can comprise a quantum computing component that can encode an eigenvalue into a phase on a quantum state of a quantum circuit. The eigenvalue can regard a topological feature of an object. The computer executable components can also comprise a classical computing component that can infer a Betti number using a Bayesian learning algorithm by measuring an ancilla state of the quantum circuit. An advantage of such a system can be the exploitation of quantum computing for complex computations and classical computing for topological classifications.

In some examples, the system can further comprise a sub-sample component that can generates a sub-sample object by selectively sampling the object. Also, the system can comprise a homology component that can characterizes the sub-sample object using a persistent homology algorithm to generate a quantum superposition state. Further, the system can comprise a matrix component that can generate a Laplacian matrix as a quantum object based on the quantum superposition state. An advantage of such a system can be the parceling out of data from a complex dataset to facilitate a topological classification through quantum and/or classical computing techniques.

According to an embodiment, a computer program product for topological classification is provided. The computer program product can comprise a computer readable storage medium having program instructions embodied therewith, the program instructions can be executable by a processor to cause the processor to encode, by a system operatively coupled to the processor, an eigenvalue into a phase on a quantum state of a quantum circuit, wherein the eigenvalue regards a topological feature of an object. The program instructions can also cause the processor to infer, by the system, a Betti number using a Bayesian learning algorithm by measuring an ancilla state of the quantum circuit. An advantage of such a computer program product can be the use of quantum computing to facilitate topological classifications with a desirable circuit depth.

In some examples, the program instructions can further cause the processor to generate, by the system, the Bayesian learning algorithm based on a previous measurement of the quantum circuit. An advantage of such a program product can be the incorporation of prior knowledge into the topological classification of complex datasets.

DETAILED DESCRIPTION

Figure 1:
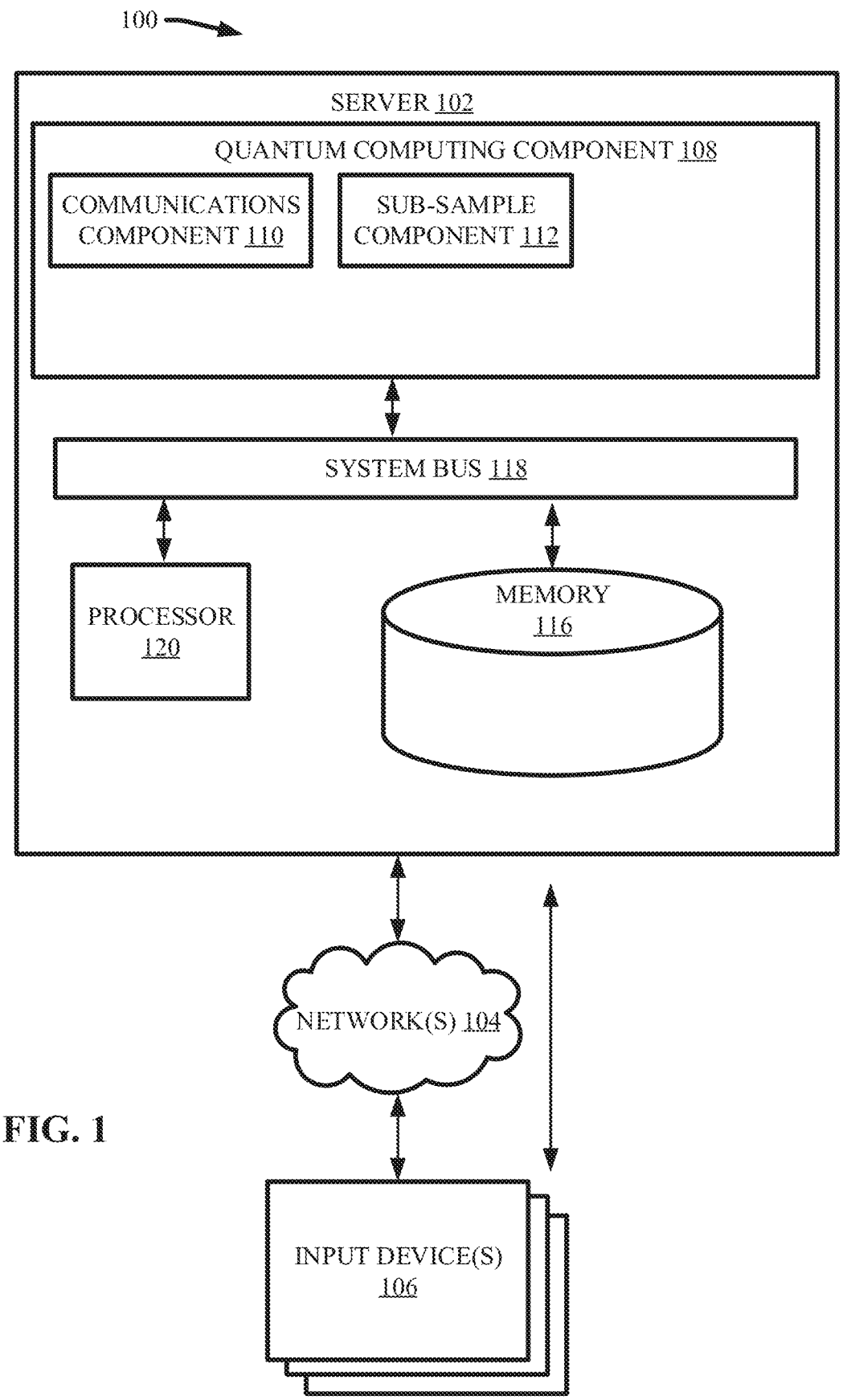
FIG. 1 illustrates a block diagram of an example, non-limiting system comprising one or more quantum computing components that can facilitate topological feature classification in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with conventional implementations of topological data analysis; the present disclosure can be implemented to produce a solution to one or more of these problems in the form of a prior knowledge-based inference of Betti numbers using a hybridization of classical computing and quantum computing techniques. Advantageously, the incorporation of prior knowledge can overcome one or more shortcomings of dimensionality with regards to quantum computing. Additionally, the incorporations of classical computation techniques can alleviate one or more challenges of fault tolerance associated with conventional quantum computing techniques. Moreover, the use of quantum computation techniques can facilitate the analysis of complex datasets, including datasets regarding applications such as: recommendation systems, neutrino detection, analyzing data gathered from the Large Hadron Collider ("LHC"), chemical compound repurposing, chemistry analyses, a combination thereof, and/or the like.

Various embodiments of the present invention can be directed to computer processing systems, computer-implemented methods, apparatus and/or computer program products that facilitate the efficient, effective, and autonomous (e.g., without direct human guidance) topological classification. For example, one or more embodiments can infer one or more Betti numbers by incorporating prior knowledge in a hybridization of classical computing and quantum computing techniques. For instance, one or more quantum computing components can encode one or more eigenvalues into a phase on a quantum state to facilitate determination of a probability distribution. Further, one or more classical computing components can incorporate knowledge of the probability distribution to infer one or more Betti numbers via conditional probability (e.g., such as implementation of a Bayesian learning algorithm).

The computer processing systems, computer-implemented methods, apparatus and/or computer program products employ hardware and/or software to solve problems that are highly technical in nature (e.g., topological classification), that are not abstract and cannot be performed as a set of mental acts by a human. For example, various embodiments described herein can regard one or more machine learning tasks and/or can implement quantum computing algorithms to facilitate the analysis of complex data.

FIG. 1 illustrates a block diagram of an example, non-limiting system 100 that can use a hybridization of classical and quantum computing techniques to facilitate topological classifications of complex datasets. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devices 106. The server 102 can comprise quantum computing component 108. The quantum computing component 108 can further comprise communications component 110 and/or sub-sample component 112. Also, the server 102 can comprise or otherwise be associated with at least one memory 116. The server 102 can further comprise a system bus 118 that can couple to various components such as, but not limited to, the quantum computing component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the quantum computing component 108 can be provided on the one or more servers 102, it should be appreciated that the architecture of system 100 is not so limited. For example, the quantum computing component 108, or one or more components of quantum computing component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more settings and/or commands into the system 100. For example, in the various embodiments described herein, a user of the system 100 can operate and/or manipulate the server 102 and/or associate components via the one or more input devices 106. Additionally, a user of the system 100 can utilize the one or more input devices 106 to display one or more outputs (e.g., displays, data, visualizations, and/or the like) generated by the server 102 and/or associate components. In various embodiments, a user of the system 100 can utilize the one or more input devices 106 and/or the one or more networks 104 to provide the server 102 one or more complex datasets. As used herein, the term "complex datasets" can refer to one or more datasets comprising a high richness of features for underlying patterns in the subject dataset. For example, one or more complex datasets can comprise data that can be characterized by non-linear patterns. Complex datasets can be general in nature (e.g., not tied to a specific application) or formulated from a specific context. Further, in one or more embodiments, the one or more input devices 106 can be comprised within, and/or operably coupled to, a cloud computing environment. Cloud computing technologies can be utilized to collect and/or analyzed a wide variety of complex datasets.

The quantum computing component 108 can analyze the one or more complex datasets shared by the one or more input devices 106 to facilitate a topological classification. For example, the communications component 110 can receive data (e.g., complex datasets) from the one or more input devices 106 (e.g., via a direct electrical connection and/or through the one or more networks 104) and share the data with the various associate components of the quantum computing component 108.

The sub-sample component 112 can generate selectively sample one or more objects characterized by a complex dataset (e.g., entered into the system 100 via the one or more input devices 106) to generate one or more sub-sample objects. The sub-sample component 112 can reduce the size of data initially analyzed by the quantum computing component 108 through the selective sampling by the sub-sample component 112. Example selective sampling techniques that can be exercised by the sub-sample component 112 can include, but are not limited to: random grid selections, random scatter selections, point cloud selections, Monte Carlo selections, boosted selections, a combination thereof, and/or the like. For instance, the sub-sample component 112 can selectively sample the complex dataset via one or more point clouds to generate one or more sub-sample objects.

Figure 2A:
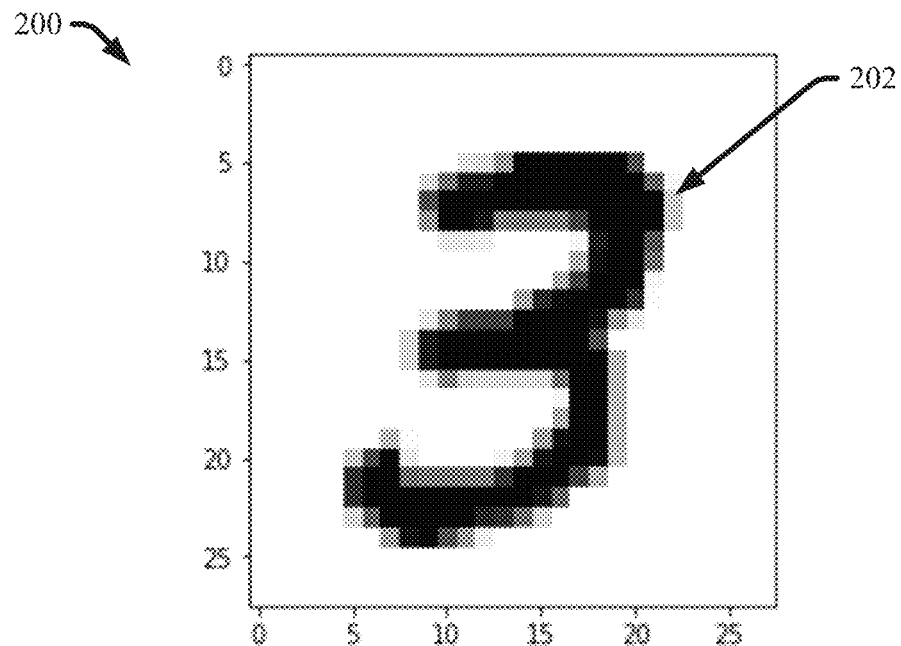
FIG. 2A illustrates a diagram of an example, non-limiting object that can be subject to topological data analysis by one or more systems in accordance with one or more embodiments described herein.

FIG. 2A illustrates a diagram of an example, non-limiting graph 200 that can depict an exemplary object 202, which can be analyzed by the one or more quantum computing components 108 in accordance with one or more embodiments described herein. Repetitive description of like elements employed in other embodiments described herein is omitted for sake of brevity. The exemplary object 202 can be characterized by one or more datasets (e.g., complex datasets) entered into the system 100 via the one or more input devices 106. For example, the exemplary object 202 shown in graph 200 can be the number three.

Figure 2B:
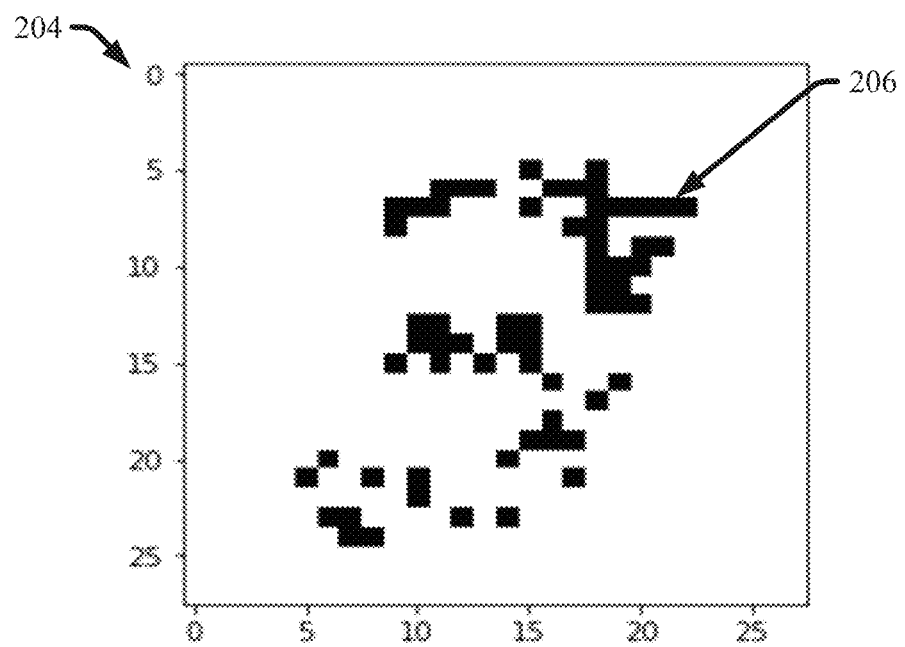
FIG. 2B illustrates a diagram of an example, non-limiting sub-sample object that can be generated by one or more quantum computing components to facilitate a topological data analysis in accordance with one or more embodiments described herein.

FIG. 2B illustrates a diagram of an example, non-limiting graph 204 that can depict an exemplary sub-sample object 206 generated by the one or more sub-sample components 112 based on the exemplary object 202 shown in graph 200. Repetitive description of like elements employed in other embodiments described herein is omitted for sake of brevity. For example, the one or more sub-sample components 112 can selectively sample the exemplary object 202 (e.g., characterized by one or more datasets, such as complex datasets) to generate one or more exemplary sub-sample objects 206 (e.g., as shown in FIG. 2B). For instance, the one or more sub-sample components 112 can generate the exemplary sub-sample object 206 shown in graph 204 via one or more point cloud techniques.

Figure 3:
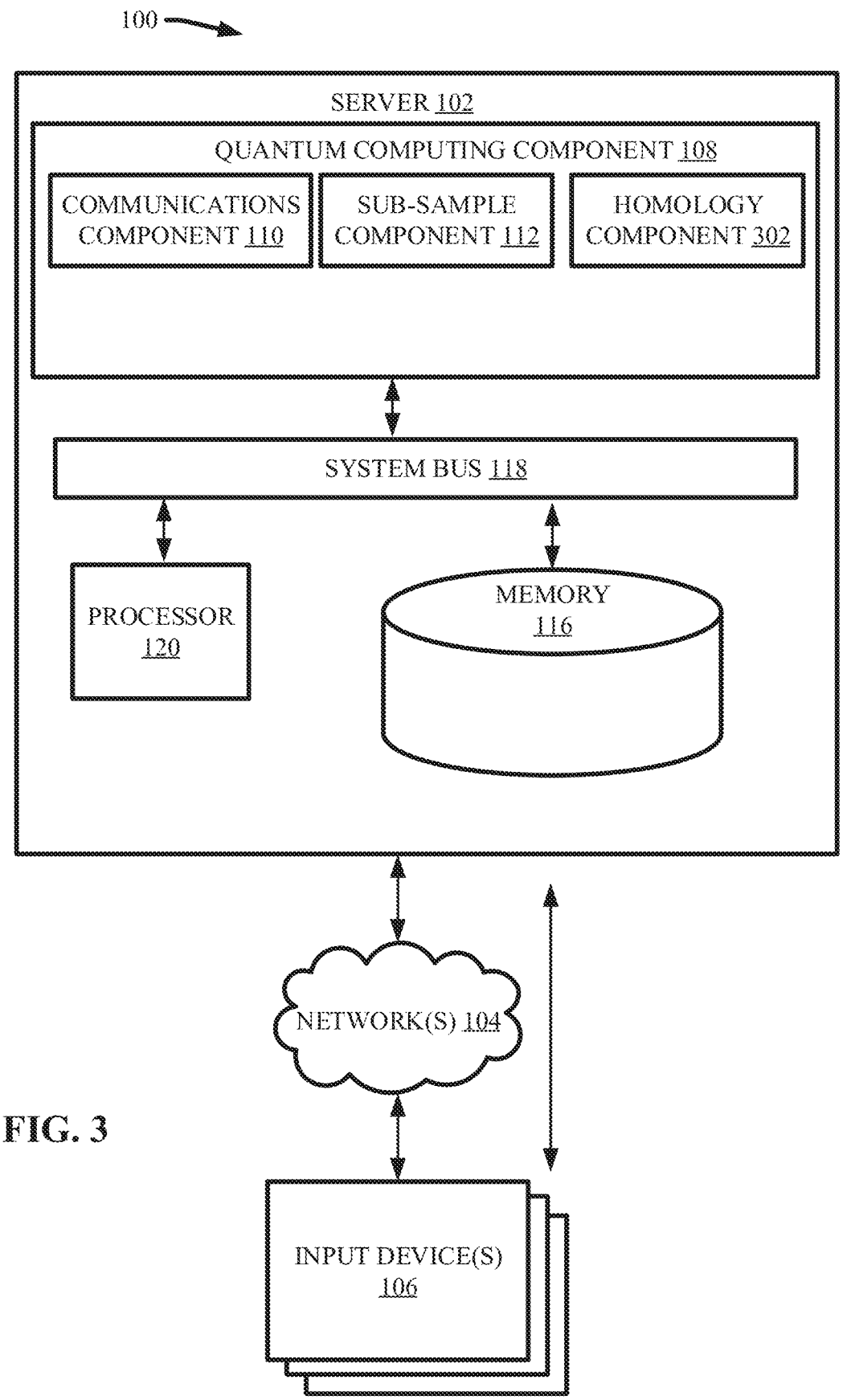
FIG. 3 illustrates a block diagram of an example, non-limiting system comprising one or more quantum computing components that can facilitate topological feature classification in accordance with one or more embodiments described herein.

FIG. 3 illustrates a diagram of the example, non-limiting system 100 further comprising homology component 302 in accordance with one or more embodiments described herein. Repetitive description of like elements employed in other embodiments described herein is omitted for sake of brevity. The one or more homology components 302 can characterize one or more sub-sample objects generated by the one or more sub-sample components 112 using one or more persistent homology algorithms to generate a quantum superposition state.

For example, the homology component 302 can utilize one or more persistent homology algorithms to discern one or more topical features (e.g., clusters and/or holes) of the one or more sub-sample objects (e.g., exemplary sub-sample object 206). For instance, the homology component 302 can generate a plurality of simplexes to delineate the connectivity between points selectively sampled from the initially analyzed object (e.g., exemplary object 202). The one or more homology components 302 can build one or more simplex constructions from one or more simplicial complexes sharing a connectivity based on a defined distance. Further, the homology component 302 can generate one or more quantum superposition states to facilitate encoding on a quantum circuit.

In one or more embodiments, the homology component 302 can generate the one or more quantum superposition states ("$\rho$") based on Equation 1, presented below.

$$\rho = \sum_k \frac{1}{|s_k|} |S_k\rangle \langle S_k| \tag{1}$$

Wherein "$S_k$" can represent one simplex state, and "$|S_k\rangle\langle S_k|$" can represent a quantum state of the subject simplex.

Figure 4:
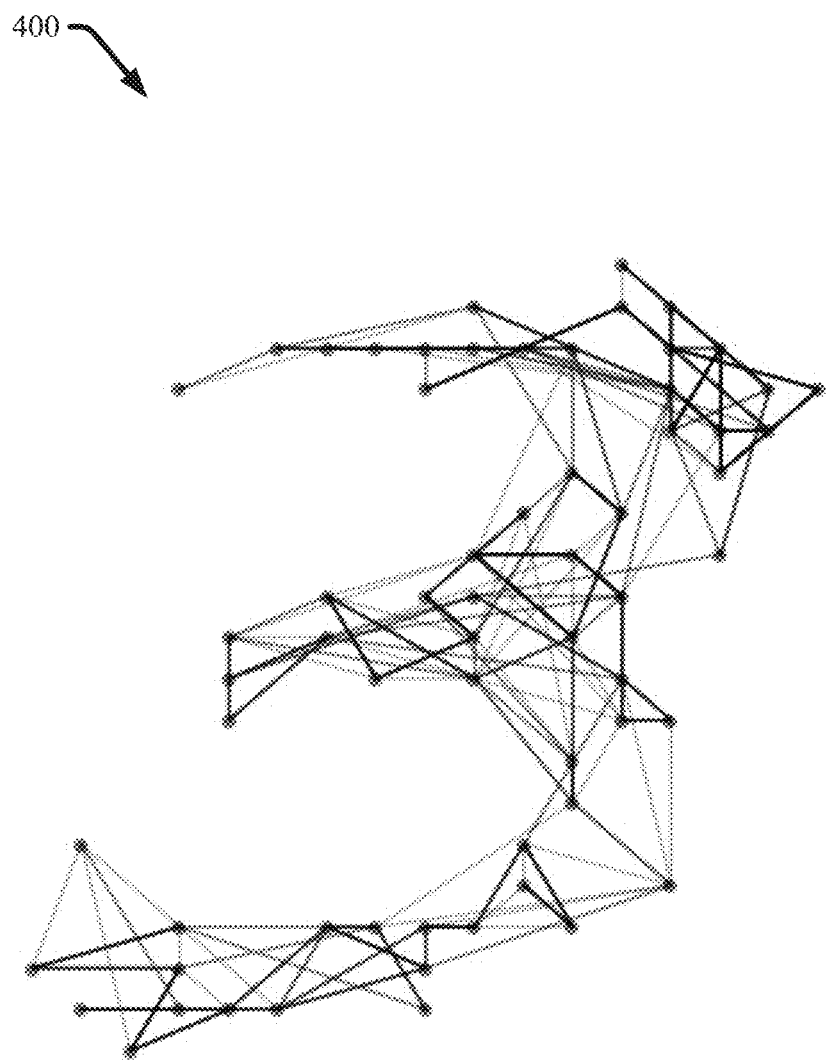
FIG. 4 illustrates a diagram of an example, non-limiting simplex construction that can be generated by one or more quantum computing components to facilitate a topological data analysis in accordance with one or more embodiments described herein.

FIG. 4 illustrates a diagram of an example, non-limiting simplex construction 400 that can be generated by the one or more homology components 302 in accordance with one or more embodiments described herein. Repetitive description of like elements employed in other embodiments described herein is omitted for sake of brevity. The exemplary simplex construction 400 depicted in FIG. 4 can be generated by the one or more homology components 302 based on the exemplary sub-sample object 206 depicted in FIG. 2B. As shown in FIG. 4, the one or more homology components 302 can determine the connectivity between selectively sampled data points (e.g., selectively sampled via the one or more sub-sample components 112) through a plurality of interconnected lines. Further, the one or more homology components 302 can begin to discern one or more topological features (e.g., components, clusters, holes, and/or voids) based on the determined connectivity of the sub-sample object (e.g., exemplary sub-sample object 206).

Figure 5:
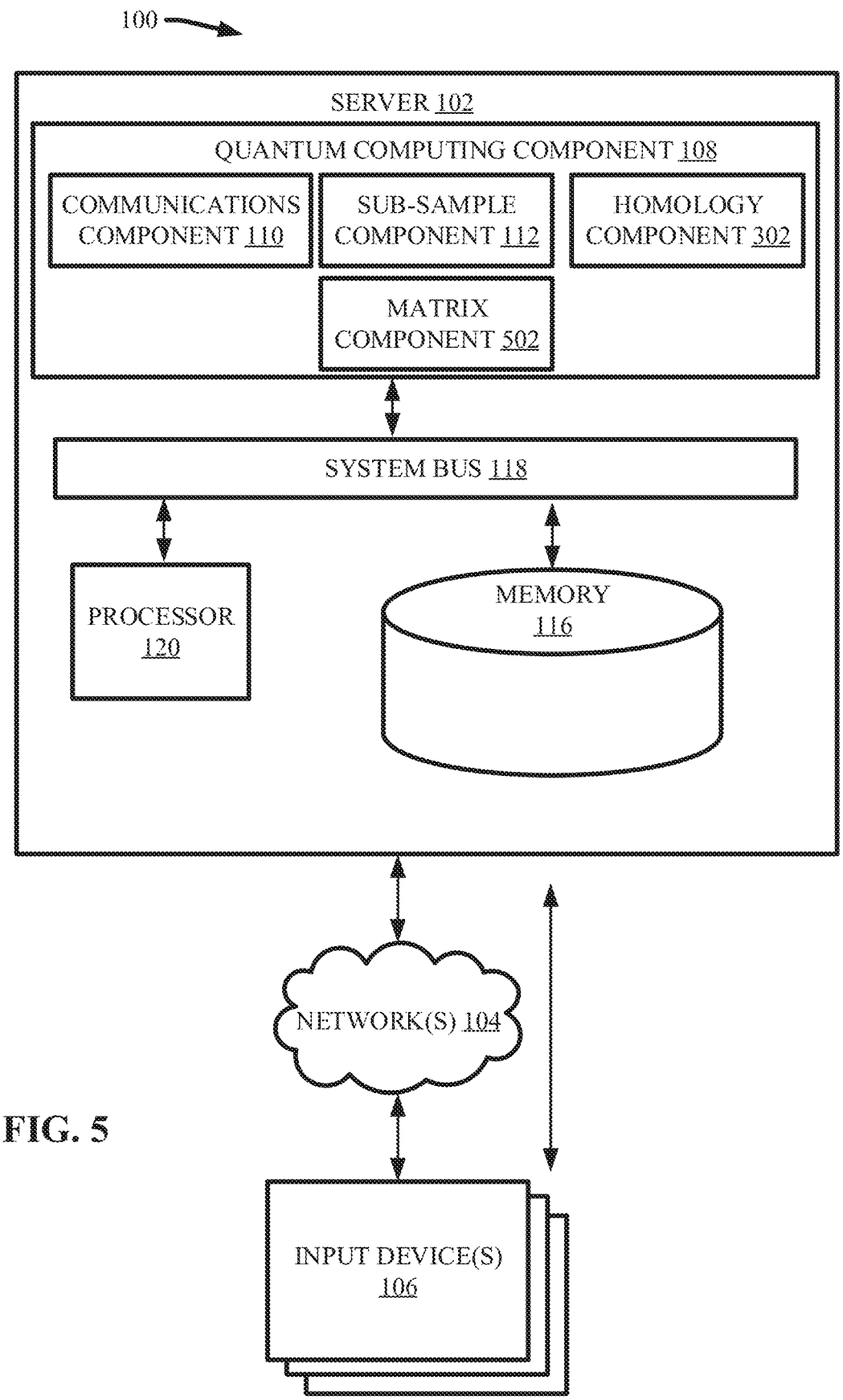
FIG. 5 illustrates a block diagram of an example, non-limiting system comprising one or more quantum computing components that can facilitate topological feature classification in accordance with one or more embodiments described herein.

FIG. 5 illustrates a diagram of the example, non-limiting system 100 further comprising matrix component 502 in accordance with one or more embodiments described herein. Repetitive description of like elements employed in other embodiments described herein is omitted for sake of brevity. The one or more matrix components 502 can generate one or more Laplacian matrices as quantum objects based on the quantum superposition state generated by the one or more homology components 302.

For example, the one or more matrix components 502 can generate one or more Laplacian matrices as quantum graph Laplacians, which can encode one or more eigenvalues into one or more phases of a quantum state. The one or more eigenvalues can be related to, and/or otherwise describe, one or more topological features discerned by the one or more homology components 302. In various embodiments, the one or more eigenvalues can characterize general topological features (e.g., the one or more eigenvalues need not be specific to a particular topological feature). Thereby, the one or more matrix components 502 can generate one or more Laplacian matrices comprising eigenvalues related to the topological features discerned through the data connectivity established by the one or more homology components 302. Further, the one or more matrix components 502 can encode the eigenvalues into one or more phases of a quantum state by using a quantum gate that can project an absolute value of an expectation value onto a phase of a quantum state.

Figure 6:
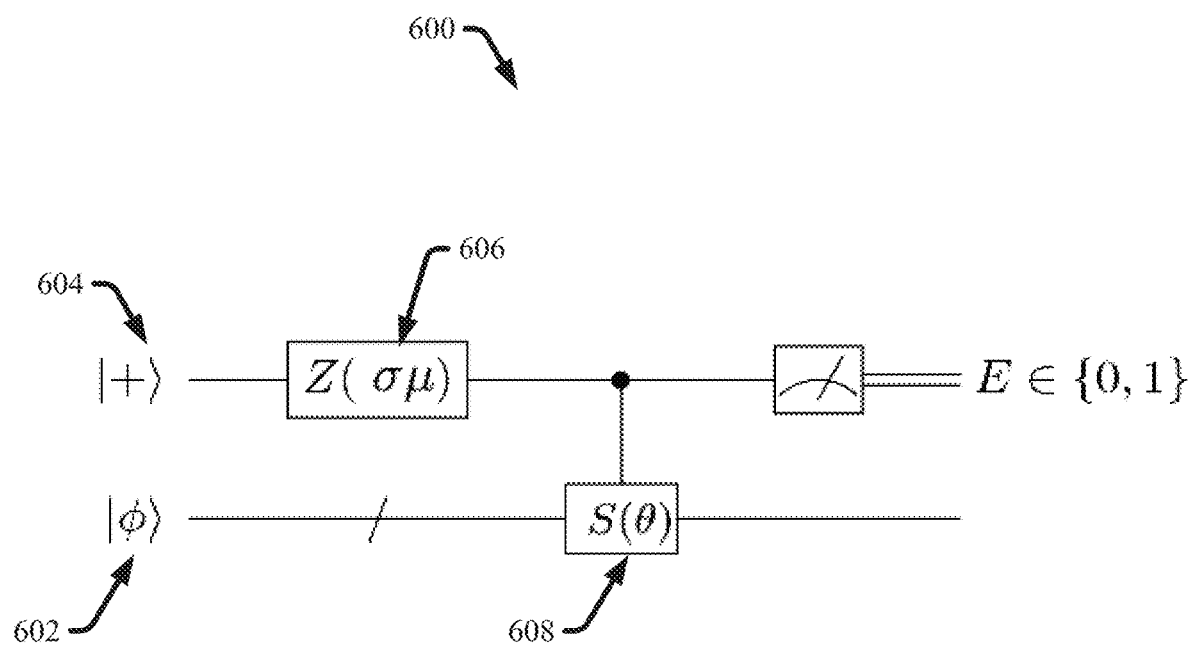
FIG. 6 illustrates a diagram of an example, non-limiting quantum circuit that can encode one or more eigenvalues into one or more quantum phases to facilitate a topological data analysis in accordance with one or more embodiments described herein.

FIG. 6 illustrates a diagram of an example, non-limiting quantum circuit 600 that can facilitate execution of the quantum encoding performed by the one or more matrix components 502 in accordance with one or more embodiments described herein. Repetitive description of like elements employed in other embodiments described herein is omitted for sake of brevity.

As shown in FIG. 6, the exemplary quantum circuit 600 can comprise one or more first quantum state 602 (e.g., represented by "φ") and one or more ancilla states 604 (e.g., represented by "+"). The one or more ancilla states 604 can be product states of the one or more first quantum states 602. The one or more ancilla states 604 can comprise one or more first quantum gates 606, which can incorporate one or more variational parameters into the quantum computing. For example, "σ" can be a variational parameter representing a Bayes risk parameter, and/or "μ" can be a variational parameter representing the mean of the target distribution in an optimization protocol. Incorporation of the one or more variational parameters via the one or more first quantum gates 606 can facilitate solving the subject inference problem being addressed by the one or more quantum computing components 108.

Further, the exemplary quantum circuit 600 can comprise one or more second quantum gates 608 located on the one or more first quantum states 602. The one or more second quantum gates 608 can facilitate the quantum encoding described herein with regard to the one or more matrix components 502. For example, the one or more second quantum gates 608 can facilitate encoding the one or more eigenvalues into one or more phases on the one or more first quantum states 602. In one or more embodiments, the one or more second quantum gates 608 are not limited to a specific quantum gate type; rather one of ordinary skill in the art will recognize that the type of applicable quantum gate can be dependent of the subject analysis and/or circuit configuration.

As shown in FIG. 6, the one or more ancilla states 604 can be measured after the quantum encoding facilitated by the one or more second quantum gates 608. Also shown in FIG. 6, the measuring of the one or more ancilla states 604 can be performed by a classical computing device. For instance, the exemplary quantum circuit 600 depicts the described transition to classical computing via a depiction of two lines extending from the measurement indication. Thereby, a classical computing measurement of the exemplary quantum circuit 600 can be achieved. Repetitive operation and/or measurement of the exemplary quantum circuit 600 can enable of generation of one or more probability distributions of the one or more encoded eigenvalues (e.g., as depicted by the equation shown in FIG. 6, wherein "E" can represent the outcome of a classical computing measurement on the quantum state).

Figure 7:
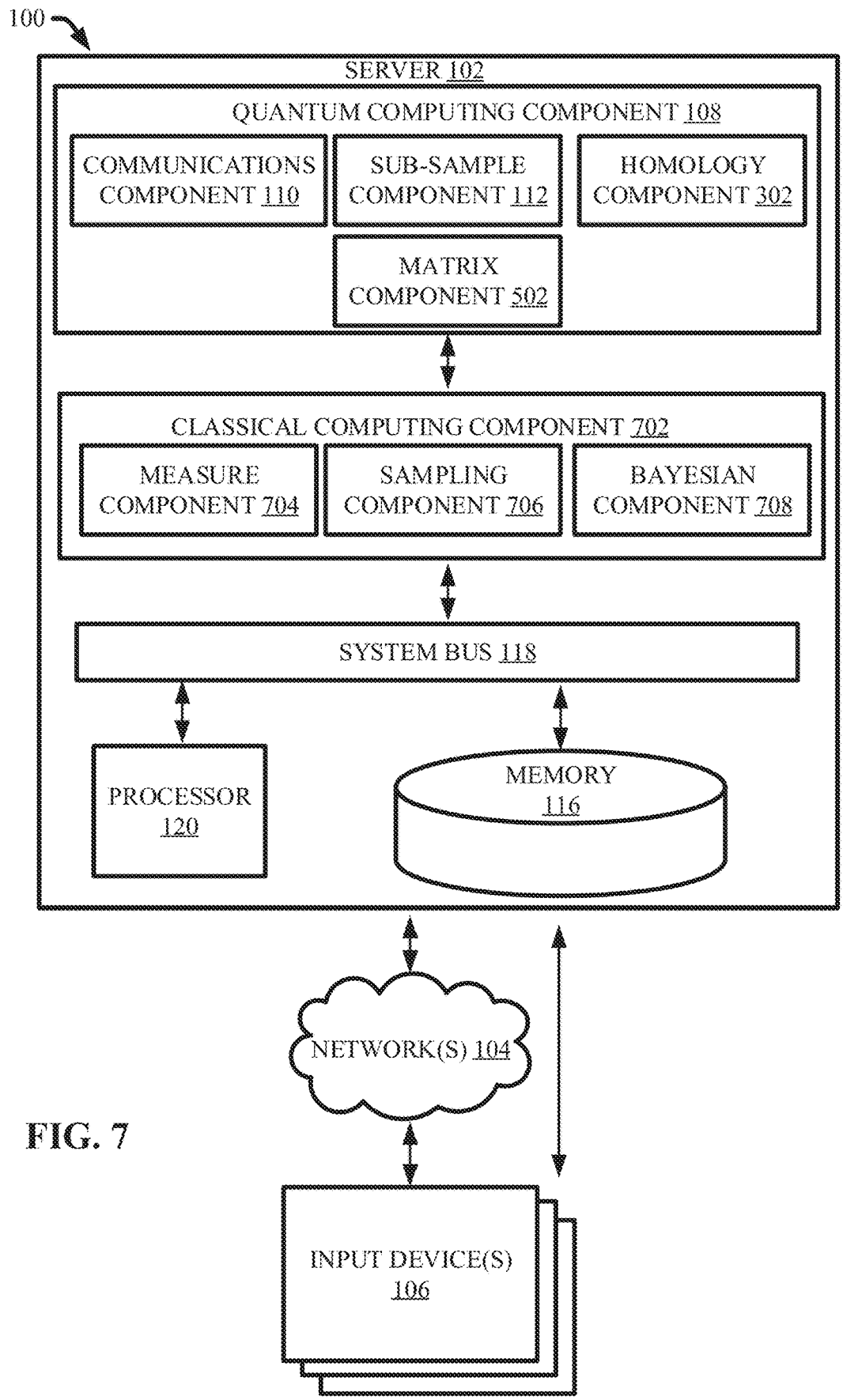
FIG. 7 illustrates a block diagram of an example, non-limiting system comprising one or more quantum computing and classical computing components that can facilitate topological feature classification in accordance with one or more embodiments described herein.

FIG. 7 illustrates a diagram of the example, non-limiting system 100 further comprising one or more classical computing components 702 in accordance with one or more embodiments described herein. Repetitive description of like elements employed in other embodiments described herein is omitted for sake of brevity. In various embodiments, the one or more quantum computing components 108 and/or the one or more classical computing components 702 can be operatively coupled via a direct electrical connection and/or via one or more networks 104. For example, in one or more embodiments the one or more classical computing components 702 can be operatively coupled to the one or more quantum computing components 108 via one or more cloud computing environments. Additionally, in various embodiments the one or more classical computing components 702 can comprise the one or more sub-sample components 112 (e.g., the selective sampling described herein can be performed via quantum and/or classical computing techniques).

The one or more classical computing components 702 can comprise measure component 704, sampling component 706, and/or Bayesian component 708. The one or more measure components 704 can measure the one or more ancilla states 604 of the quantum computing component 108 using one or more classical computation methods. For example, the measure component 704 can measure the one or more ancilla states 604 in accordance with Equation 2, presented below.

$$P_{\sigma,\theta}(E \mid \varphi(\theta), \mu, \sigma) = \frac{1 + (-1)^E \cos(4\pi i \varphi(\theta) + ik)}{2}; \quad (2)$$

$$\varphi(\theta) = \mathrm{across}(\langle\psi(\theta)|H|\psi(\theta)\rangle)$$

Wherein "i" can represent the complex value (e.g., $\sqrt{(-1)}$), "k" can represent a regularization term, and/or "H" can represent a Hamiltonian or a Hermitian operator. In one or more embodiments, the one or more measure components 704 can repeatedly measure the one or more ancilla states 604 to generate one or more probability distributions in accordance with Equation 2.

The one or more sampling components 706 can analyze the one or more probability distributions generated by the one or more measure components 704 using one or more sampling algorithms to update one or more prior knowledge distributions. Example sampling algorithms can include, but are not limited to: random grid selections, random scatter selections, point cloud selections, Monte Carlo selections, boosted selections, a combination thereof, and/or the like. For example, the one or more prior knowledge distributions can characterize previous measurements of the one or more ancilla states 604 measured by the one or more measure components 704. One of ordinary skill in the art will readily recognize that the one or more analyses described herein can accommodate for a wide variety of general prior knowledge distributions.

The one or more Bayesian components 708 can generate one or more Bayesian learning algorithms based on the one or more prior knowledge distributions and the one or more probability distributions. Further, the one or more Bayesian components 708 can infer one or more Betti numbers using the one or more Bayesian learning algorithms. The one or more Betti numbers can regard one or more topological features discerned and/or encoded by the one or more quantum computing components 108. Equation 3 below can characterize an exemplary Bayesian learning algorithm that can be generated by the one or more Bayesian components 708 and/or utilized to infer the one or more Betti numbers.

$$P(\varphi \mid E, \mu, \sigma) = \frac{P(E \mid \varphi, \mu, \sigma) P(\varphi)}{\int P(E \mid \varphi, \mu, \sigma) P(\varphi) d\varphi} \quad (3)$$

Wherein "P(φ)" can represent the one or more prior knowledge distributions.

Thereby, the one or more classical computing components 702 can incorporate prior knowledge into inferring one or more Betti numbers, which can describe the topological features of an object subject to analysis by the system 100 (e.g., exemplary object 202), via conditional probability. Further, the one or more classical computing components 702 can share the one or more inferred Betti numbers with the one or more quantum computing components 108 to further refine the one or more persistent homology algorithms in subsequent analysis iterations performed by the one or more quantum computing components 108 and their associate components. Thus, computations achieved by the one or more quantum computing components 108 can form the basis of one or more computations achieved by the one or more classical computing components 702 and vise versa in a feedback loop. The feedback loop can reiterate until a convergence regarding the inferred Betti numbers is reached and/or for a number of times defined by a user of the system 100 (e.g., via the one or more input devices 106). Thereby, the system 100 can classify various topological features of an object characterized by one or more complex datasets through a hybridization of quantum and classical computing, which can incorporate prior knowledge to refine one or more analytical processes.

Figure 8A:
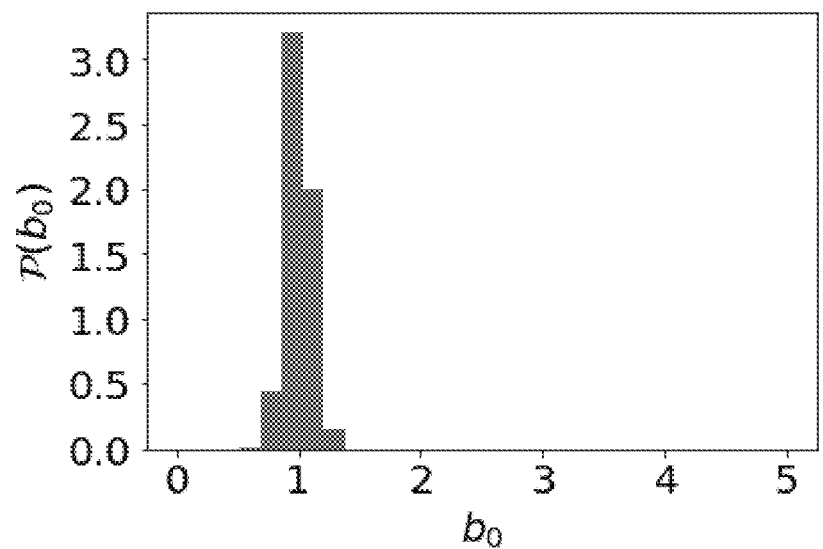
FIG. 8A illustrates a diagram of an example, non-limiting graph that can depict a probability distribution that can be generated to facilitate inference of one or more Betti numbers in accordance with one or more embodiments described herein.

FIG. 8A illustrates a diagram of an example, non-limiting graph 800 that can depict a Betti number inference that can be performed by the one or more classical computing components 702 in accordance with one or more embodiments described herein. Repetitive description of like elements employed in other embodiments described herein is omitted for sake of brevity. Graph 800 can be generated by the one or more classical computing components 702 based on the exemplary simplex construction 400 shown in FIG. 4. As shown in FIG. 8, "$b_0$" can represent the number of connected components discerned from the exemplary simplex construction 400. For example, the classical computing component 702 can infer that object analyzed by the one or more quantum computing components 108 (e.g., the exemplary object 202) comprises 1 connected component.

Figure 8B:
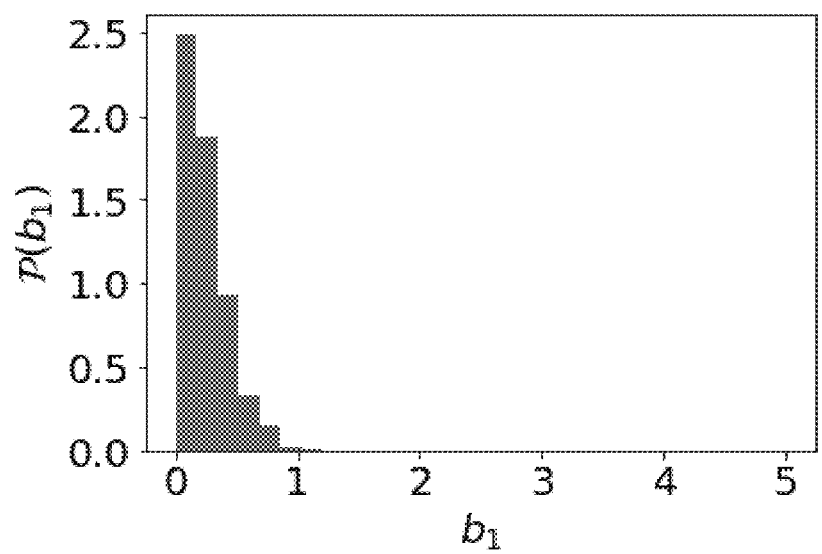
FIG. 8B illustrates a diagram of an example, non-limiting graph that can depict a probability distribution that can be generated to facilitate inference of one or more Betti numbers in accordance with one or more embodiments described herein.

FIG. 8B illustrates a diagram of an example, non-limiting graph 802 that can depict another Betti number inference that can be performed by the one or more classical computing components 702 in accordance with one or more embodiments described herein. Repetitive description of like elements employed in other embodiments described herein is omitted for sake of brevity. Graph 802 can also be generated by the one or more classical computing components 702 based on the exemplary simplex construction 400 shown in FIG. 4. As shown in FIG. 8, "$b_1$" can represent the number of holes discerned from the exemplary simplex construction 400. For example, the classical computing component 702 can infer that object analyzed by the one or more quantum computing components 108 (e.g., the exemplary object 202) comprises 0 holes.

Figure 9:
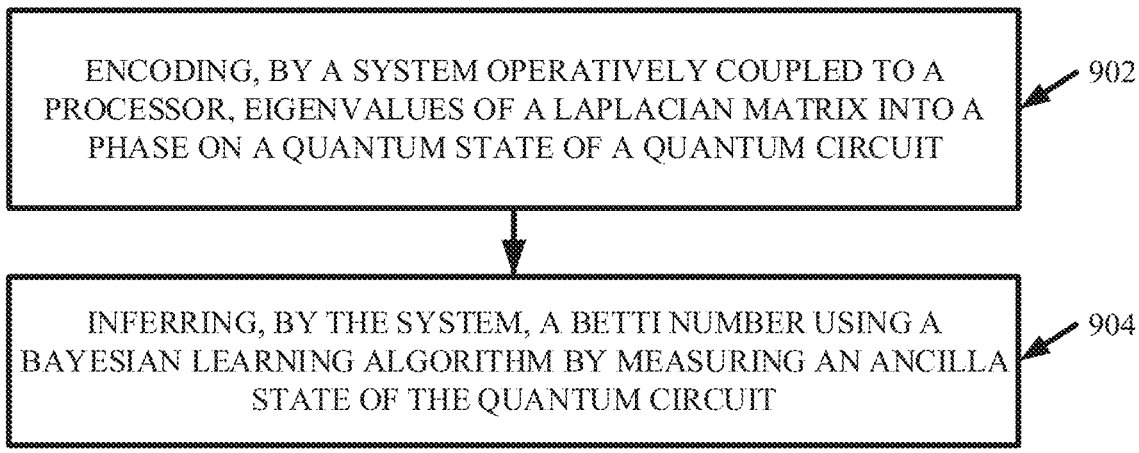
FIG. 9 illustrates a flow diagram of an example, non-limiting method that can facilitate a topological data analysis using a hybridization scheme of both quantum and classical computing technologies in accordance with one or more embodiments described herein.

FIG. 9 illustrates a flow diagram of an example, non-limiting method 900 that can facilitate one or more topological classifications of complex datasets using a hybridization of quantum and classical computing techniques in accordance with one or more embodiments described herein. Repetitive description of like elements employed in other embodiments described herein is omitted for sake of brevity.

At 902, the method 900 can comprise encoding, by a system 100 operatively coupled to one or more processors 120, one or more eigenvalues of one or more Laplacian matrices into one or more phases on a quantum state (e.g., one or more first quantum states 602) of a quantum circuit (e.g., exemplary quantum circuit 600). For example, the encoding can be performed in accordance with the various features of the one or more quantum computing components 108 described herein. For instance, the encoding at 902 can comprise: selectively sampling an object, characterizing a sub-object via one or more persistent homology algorithms, constructing one or more simplex constructions, and/or generating one or more Laplacian matrices.

At 904, the method 900 can comprise inferring, by the system 100, one or more Betti numbers using one or more Bayesian learning algorithms by measuring one or more ancilla states (e.g., exemplary ancilla states 604) of the quantum circuit (e.g., exemplary quantum circuit 600). For example, the inferring can be performed in accordance with the various features of the one or more classical computing components 702 described herein. For instance, the inferring at 904 can comprise: measuring the one or more ancilla states, generating one or more probability distributions, generating and/or updating one or more prior knowledge distributions, and/or inferring the one or more Betti numbers using a conditional probability technique that incorporates prior knowledge (e.g., one or more Bayesian learning algorithms).

Figure 10:
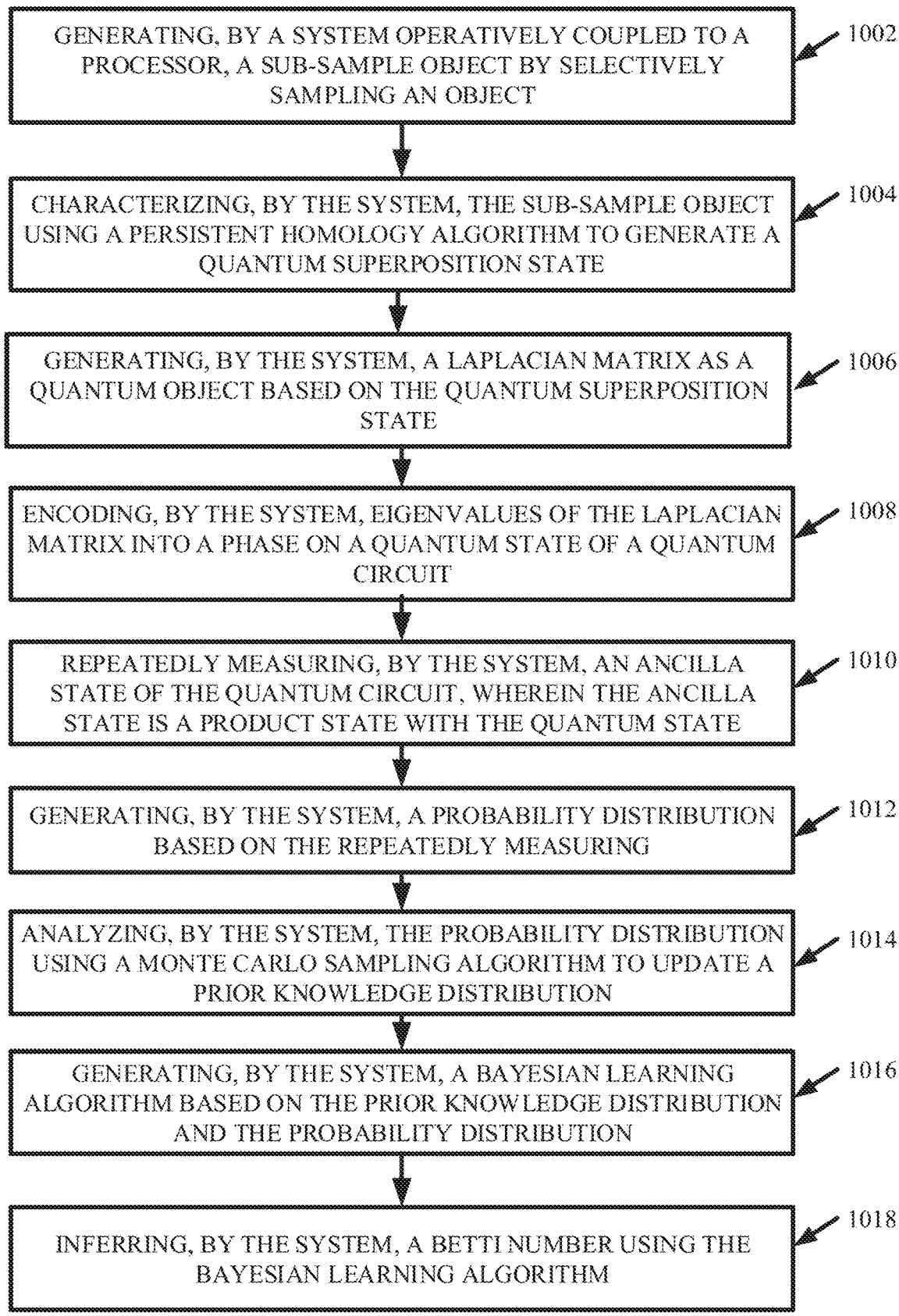
FIG. 10 illustrates a flow diagram of an example, non-limiting method that can facilitate a topological data analysis using a hybridization scheme of both quantum and classical computing technologies in accordance with one or more embodiments described herein.

FIG. 10 illustrates a flow diagram of an example, non-limiting method 1000 that can facilitate one or more topological classifications of complex datasets using a hybridization of quantum and classical computing techniques in accordance with one or more embodiments described herein. Repetitive description of like elements employed in other embodiments described herein is omitted for sake of brevity.

At 1002, the method 1000 can comprise generating, by a system 100 operatively coupled to one or more processors 120, one or more sub-sample objects by selectively sampling one or more objects. For example, generating the one or more sub-sample objects can be performed in accordance with the various features of the one or more sub-sample component 112 described herein. For instance, the generating at 1002 can be performed using one or more point clouds.

At 1004, the method 1000 can comprise characterizing, by the system 100, the one or more sub-sample objects using one or more persistent homology algorithms to generate one or more quantum superposition states. For example, characterizing the one or more sub-sample objects can be performed in accordance with the various features of the one or more homology components 302 described herein. For instance, the characterizing at 1004 can comprise generating one or more simplex constructions to discern a connectivity of the one or more sub-sample objects.

At 1006, the method 1000 can comprise generating, by the system 100, one or more Laplacian matrices as one or more quantum objects based on the one or more quantum superposition states. For example, generating the one or more Laplacian matrices can be performed in accordance with the various features of the one or more matrix components 502 described herein. For instance, the one or more Laplacian matrices can comprise one or more eigenvalues regarding one or more topological features discerned during the characterizing at 1004.

At 1008, the method 1000 can comprise encoding, by the system 100, the one or more eigenvalues of the one or more Laplacian matrices into one or more phases on one or more quantum states of one or more quantum circuits. For example, encoding the one or more eigenvalues can be performed in accordance with the various features of the one or more quantum computing components 108 (e.g., via the one or more matrices components 502). In various embodiments, the quantum circuit can comprise one or more ancilla states that can be product states of the one or more quantum states encoded with the one or more eigenvalues.

At 1010, the method 1000 can comprise repeatedly measuring, by the system 100, the one or more ancilla states of the quantum circuit. For example, the measuring can be performed in accordance with the various features of the one or more measure components 704 described herein. The repeated measuring at 1010 can provide one or more classical computations described the subject quantum circuit. For instance, at 1012 the method 1000 can comprise generating, by the system 100, one or more probability distributions based on the repeated measuring at 1010.

At 1014, the method 1000 can comprise analyzing, by the system 100, the one or more probability distributions using one or more Monte Carlo sampling algorithms to update one or more prior knowledge distributions. For example, the analyzing can be performed in accordance with the various features of the one or more sampling components 706 described herein. In one or more embodiments, the Monte Carlo sampling algorithms can facilitate in refining the one or more prior knowledge distributions (e.g., via noise reduction).

At 1016, the method 1000 can comprise generating, by the system 100, one or more Bayesian learning algorithms based on the one or more prior knowledge distributions and/or the one or more probability distributions. For example, generating the one or more Bayesian learning algorithms can be performed in accordance with the various features of the one or more Bayesian components 708 described herein. For instance, the one or more Bayesian learning algorithms generated at 1016 can be characterized by Equation 3.

At 1018, the method 1000 can comprise inferring, by the system 100, one or more Betti numbers using the one or more Bayesian learning algorithms generated at 1016. For example, inferring the one or more Betti numbers can be performed in accordance with the various features of the one or more classical computing components 702 (e.g., via the one or more Bayesian components 708) described herein. Thereby, the one or more Betti number inferences can be based on one or more measurements of the one or more ancilla states of the one or more quantum circuits and/or can incorporate one or more prior knowledge distributions to increase accuracy and/or efficiency.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
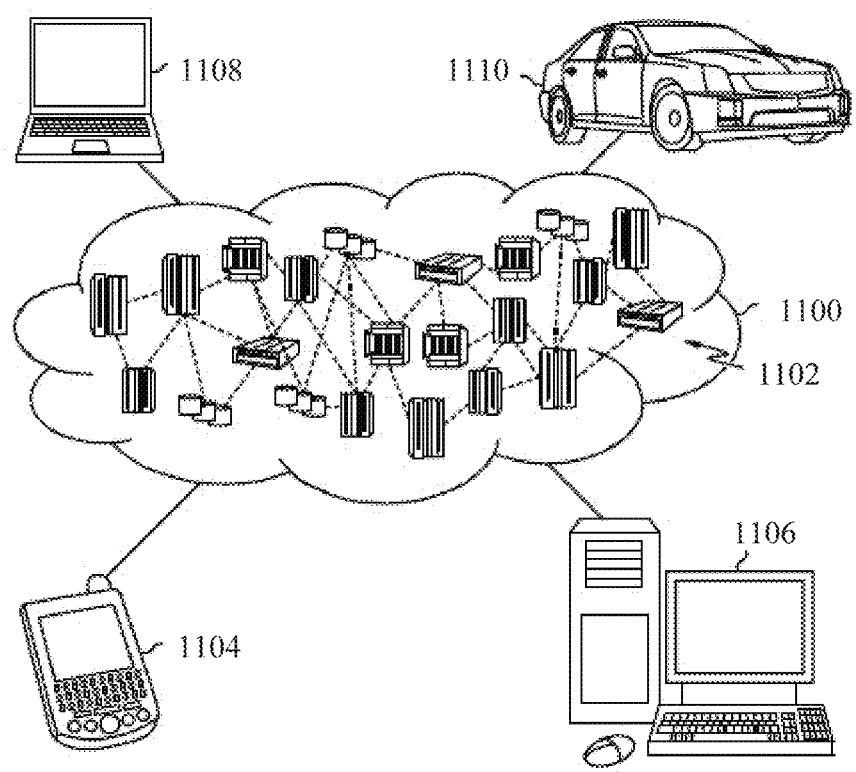
FIG. 11 depicts a cloud computing environment in accordance with one or more embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104-1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
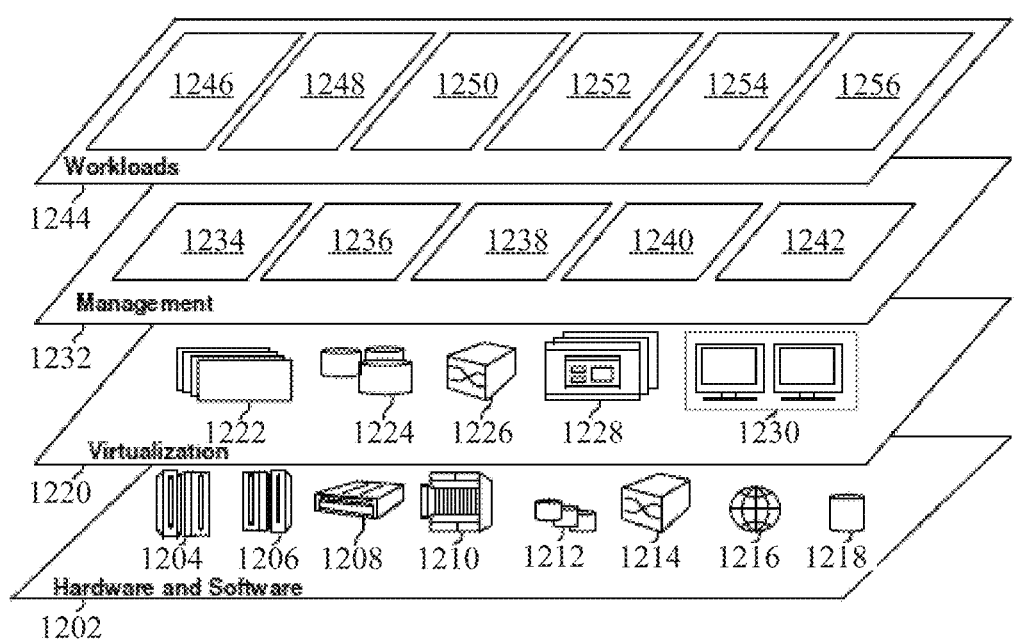
FIG. 12 depicts abstraction model layers in accordance with one or more embodiments described herein

Referring now to FIG. 12, a set of functional abstraction layers provided by cloud computing environment 1100 (FIG. 11) is shown. Repetitive description of like elements employed in other embodiments described herein is omitted for sake of brevity. It should be understood in advance that the components, layers, and functions shown in FIG. 12 are intended to be illustrative only and embodiments of the invention are not limited thereto. As depicted, the following layers and corresponding functions are provided.

Hardware and software layer 1202 includes hardware and software components. Examples of hardware components include: mainframes 1204; RISC (Reduced Instruction Set Computer) architecture based servers 1206; servers 1208; blade servers 1210; storage devices 1212; and networks and networking components 1214. In some embodiments, software components include network application server software 1216 and database software 1218.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1232 may provide the functions described below. Resource provisioning 1234 provides dynamic procurement of computing resources and other resources that are utilized to perform tasks within the cloud computing environment. Metering and Pricing 1236 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1238 provides access to the cloud computing environment for consumers and system administrators. Service level management 1240 provides cloud computing resource allocation and management such that required service levels are met. Service Level Agreement (SLA) planning and fulfillment 1242 provide pre-arrangement for, and procurement of, cloud computing resources for which a future requirement is anticipated in accordance with an SLA.

Workloads layer 1244 provides examples of functionality for which the cloud computing environment may be utilized. Examples of workloads and functions which may be provided from this layer include: mapping and navigation 1246; software development and lifecycle management 1248; virtual classroom education delivery 1250; data analytics processing 1252; transaction processing 1254; and topological classification 1256. Various embodiments of the present invention can utilize the cloud computing environment described with reference to FIGS. 11 and 12 to communicate between one or more components (e.g., between the one or more quantum computing components 108, classical computing components 702, and/or input devices 106) and/or facilitate a prior-knowledge inference of Betti numbers from complex datasets.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 13:
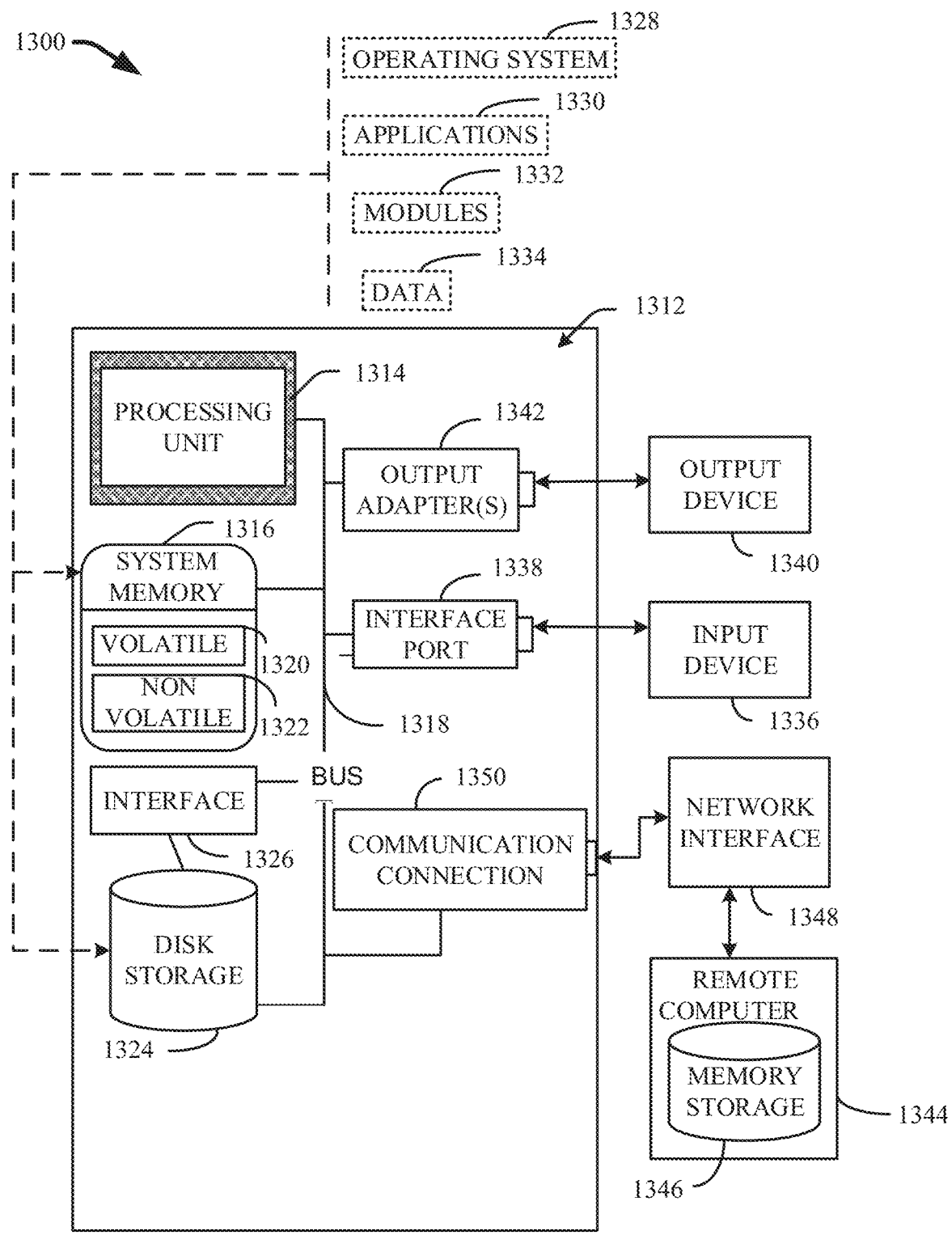
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can include a computer 1312. The computer 1312 can also include a processing unit 1314, a system memory 1316, and a system bus 1318. The system bus 1318 can operably couple system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, can be stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface can be used, such as interface 1326. FIG. 13 also depicts software that can act as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 can take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through one or more input devices 1336. Input devices 1336 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1314 through the system bus 1318 via one or more interface ports 1338. The one or more Interface ports 1338 can include, for example, a serial port, a parallel port, a game port, and a universal serial bus (USB). One or more output devices 1340 can use some of the same type of ports as input device 1336. Thus, for example, a USB port can be used to provide input to computer 1312, and to output information from computer 1312 to an output device 1340. Output adapter 1342 can be provided to illustrate that there are some output devices 1340 like monitors, speakers, and printers, among other output devices 1340, which require special adapters. The output adapters 1342 can include, by way of illustration and not limitation, video and sound cards that provide a means of connection between the output device 1340 and the system bus 1318. It should be noted that other devices and/or systems of devices provide both input and output capabilities such as one or more remote computers 1344.

Computer 1312 can operate in a networked environment using logical connections to one or more remote computers, such as remote computer 1344. The remote computer 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer 1344. Remote computer 1344 can be logically connected to computer 1312 through a network interface 1348 and then physically connected via communication connection 1350. Further, operation can be distributed across multiple (local and remote) systems. Network interface 1348 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA)

instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor, operably coupled to the memory, and that executes the computer executable components stored in the memory, wherein the computer executable components comprise:
   a quantum computing component that encode eigenvalues of a Laplacian matrix into a phase on a quantum state of a quantum circuit; and
   a classical computing component that infers a Betti number using a Bayesian learning algorithm by measuring an ancilla state of the quantum circuit.

2. The system of claim 1, further comprising:
   a sub-sample component that selectively samples an object to generate a sub-sample object.

3. The system of claim 2, further comprising:
   a homology component that characterizes the sub-sample object using a persistent homology algorithm to generate a quantum superposition state.

4. The system of claim 3, further comprising:
   a matrix component that builds the Laplacian matrix as a quantum object based on the quantum superposition state.

5. The system of claim 4, further comprising:
   a measure component that repeatedly measures the ancilla state, and generates a probability distribution.

6. The system of claim 5, further comprising:
   a sampling component that analyzes the probability distribution using a sampling algorithm to update a prior knowledge distribution.

7. The system of claim 6, further comprising:
   a Bayesian component that generates the Bayesian learning algorithm based on the prior knowledge distribution and the probability distribution.

8. The system of claim 1, wherein the Betti number is comprised within a plurality of Betti numbers inferred by the classical computing component, and wherein the plurality of Betti numbers characterize a topology of an object.

9. A computer-implemented method, comprising:
encoding, by a system operatively coupled to a processor, eigenvalues of a Laplacian matrix into a phase on a quantum state of a quantum circuit; and
inferring, by the system, a Betti number using a Bayesian learning algorithm by measuring an ancilla state of the quantum circuit.

10. The computer-implemented method of claim 9, further comprising:
generating, by the system, a sub-sample object by selectively sampling an object.

11. The computer-implemented method of claim 10, further comprising:
characterizing, by the system, the sub-sample object using a persistent homology algorithm to generate a quantum superposition state.

12. The computer-implemented method of claim 11, further comprising:
generating, by the system, the Laplacian matrix as a quantum object based on the quantum superposition state.

13. The computer-implemented method of claim 12, further comprising:
repeatedly measuring, by the system, the ancilla state, wherein the ancilla state is a product state with the quantum state; and
generating, by the system, a probability distribution based on the repeatedly measuring.

14. The computer-implemented method of claim 13, further comprising:
analyzing, by the system, the probability distribution using a sampling algorithm to update a prior knowledge distribution.

15. The computer-implemented method of claim 14, further comprising:
generating, by the system, the Bayesian learning algorithm based on the prior knowledge distribution and the probability distribution.

16. A computer program product for topological classification, the computer program product comprising a computer readable storage medium having program instructions embodied therewith, the program instructions executable by a processor to cause the processor to:
encode, by a system operatively coupled to the processor, eigenvalues of a Laplacian matrix into a phase on a quantum state of a quantum circuit; and
infer, by the system, a Betti number using a Bayesian learning algorithm by measuring an ancilla state of the quantum circuit.

17. The computer program product of claim 16, wherein the program instructions further cause the processor to:
generate, by the system, a sub-sample object by selectively sampling an object;
characterize, by the system, the sub-sample object using a persistent homology algorithm to generate a quantum superposition state; and
generate, by the system, the Laplacian matrix as a quantum object based on the quantum superposition state.

18. The computer program product of claim 16, wherein the program instructions further cause the processor to:
repeatedly measure, by the system, the ancilla state, wherein the ancilla state is a product state with the quantum state;
generate, by the system, a probability distribution based on the repeatedly measuring; and
analyze, by the system, the probability distribution using a sampling algorithm to update a prior knowledge distribution.

19. The computer program product of claim 16, wherein system infers the Betti number using a cloud computing environment.

20. A system, comprising:
a memory that stores computer executable components;
a processor, operably coupled to the memory, and that executes the computer executable components stored in the memory, wherein the computer executable components comprise:
a quantum computing component that encodes an eigenvalue into a phase on a quantum state of a quantum circuit, wherein the eigenvalue regards a topological feature of an object; and
a classical computing component that infers a Betti number using a Bayesian learning algorithm by measuring an ancilla state of the quantum circuit.

21. The system of claim 20, further comprising:
a sub-sample component that generates a sub-sample object by selectively sampling the object;
a homology component that characterizes the sub-sample object using a persistent homology algorithm to generate a quantum superposition state; and
a matrix component that generates a Laplacian matrix as a quantum object based on the quantum superposition state.

22. The system of claim 20 further comprising:
a measure component that repeatedly measures the ancilla state and generates a probability distribution, wherein the ancilla state is a product state with the quantum state; and
a sampling component that analyzes the probability distribution using a sampling algorithm to update a prior knowledge distribution.

23. A computer program product for topological classification, the computer program product comprising a computer readable storage medium having program instructions embodied therewith, the program instructions executable by a processor to cause the processor to:
encode, by a system operatively coupled to the processor, an eigenvalue into a phase on a quantum state of a quantum circuit, wherein the eigenvalue regards a topological feature of an object; and
infer, by the system, a Betti number using a Bayesian learning algorithm by measuring an ancilla state of the quantum circuit.

24. The computer program product of claim 23, wherein the program instructions further cause the processor to:
derive, by the system, the eigenvalue from a Laplacian matrix.

25. The computer program product of claim 24, wherein the program instructions further cause the processor to:
generate, by the system, the Bayesian learning algorithm based on a previous measurement of the quantum circuit.

* * * * *